United States Patent
Shirai

(10) Patent No.: US 8,427,710 B2
(45) Date of Patent: Apr. 23, 2013

(54) COMMUNICATION DEVICE AND METHOD FOR REJECTING TO STORE DATA IN A DISABLED DATABASE FIELD

(75) Inventor: Takaaki Shirai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 996 days.

(21) Appl. No.: 12/475,843

(22) Filed: Jun. 1, 2009

(65) Prior Publication Data

US 2010/0011006 A1 Jan. 14, 2010

(30) Foreign Application Priority Data

Jul. 8, 2008 (JP) .................................. 2008-177463

(51) Int. Cl.
*H04N 1/00* (2006.01)
(52) U.S. Cl.
USPC ........... 358/402; 358/404; 358/1.15; 358/1.9; 707/E17.01; 707/E17.005
(58) Field of Classification Search .................. None
See application file for complete search history.

(56) References Cited

U.S. PATENT DOCUMENTS

| | | | | |
|---|---|---|---|---|
| 5,557,723 | A | * | 9/1996 | Holt et al. .................. 715/226 |
| 5,960,442 | A | * | 9/1999 | Pickering ................. 379/218.01 |
| 6,005,927 | A | * | 12/1999 | Rahrer et al. ............ 379/142.01 |
| 6,167,411 | A | * | 12/2000 | Narayanaswamy .......... 715/217 |
| 6,208,713 | B1 | * | 3/2001 | Rahrer et al. ................ 379/67.1 |
| 7,283,986 | B2 | * | 10/2007 | Okunseinde et al. ................ 1/1 |
| 7,343,364 | B2 | * | 3/2008 | Bram et al. ...................... 706/47 |
| 8,010,610 | B2 | * | 8/2011 | Bumiller ......................... 709/206 |
| 2002/0013786 | A1 | * | 1/2002 | Machalek ....................... 707/503 |
| 2002/0120707 | A1 | | 8/2002 | Haze et al. |
| 2003/0038972 | A1 | * | 2/2003 | Benstein ...................... 358/1.18 |
| 2006/0152751 | A1 | * | 7/2006 | Shimoda et al. ............. 358/1.14 |
| 2006/0262665 | A1 | * | 11/2006 | Cho .................................. 369/1 |
| 2008/0163069 | A1 | * | 7/2008 | Eilers ............................ 715/744 |

FOREIGN PATENT DOCUMENTS

| | | |
|---|---|---|
| JP | 5-035688 | 2/1993 |
| JP | 2000-115339 | 4/2000 |
| JP | 2002-261972 | 9/2002 |
| JP | 2006-287617 | 10/2006 |
| JP | 2007-27963 | 2/2007 |
| JP | 2008-118346 | 5/2008 |

OTHER PUBLICATIONS

Japanese Official Action dated Jun. 1, 2010 with English translation.

* cited by examiner

*Primary Examiner* — Dung Tran
(74) *Attorney, Agent, or Firm* — Scully, Scott, Murphy & Presser PC

(57) ABSTRACT

A communication device includes a storing unit, a first determining unit, a rejection unit, and a communication unit. The storing unit stores a database structured to have collection of records. Each record is configured from a plurality of fields including a contact name field for entry of a name of a contact and a data field set including a plurality of fields for entry of data in association with the name of a contact. The first determining unit is configured to determine whether a field included in the data field set is enabled or disabled. The rejection unit is configured to reject to store data in a field of the database that is determined to be disabled by the first determining unit. The communication unit is communicable with the contact based on data in the database.

11 Claims, 14 Drawing Sheets

FIG.3

| RECORD NUMBER | NAME | NICKNAME | FAX NUMBER | E-MAIL | COMMUNICATION MODE | ACCESS DATE |
|---|---|---|---|---|---|---|
| 1 | TARO YAMADA | TARO | 03-3455-67XX | | FAX | 2008/05/30 09:10:35 |
| 2 | ICHIRO SATO | ICHIRO | 03-1234-56XX | ichi@zzz.ne.jp | E-MAIL | 2007/12/16 08:58:45 |
| 3 | ABC CO | ABC | 03-9876-54XX | | FAX | 2008/05/30 10:02:46 |
| 4 | ABC OSAKA BO | ABC OSAKA | 06-5432-54XX | | FAX | 2008/05/30 10:04:10 |
| 5 | ABC SAPPORO BO | ABC SAPPORO | 011-876-54XX | | FAX | 2008/05/29 13:42:08 |
| 6 | XYZ MARKETING | XYZ M | 052-22087XX | | FAX | 2008/03/04 16:26:37 |
| 7 | XYZ DEVELOPMENT | XYZ D | 052-220-12XX | | FAX | 2008/01/08 11:15:20 |
| 8 | JIRO SUZUKI | JIRO | 042-654-09XX | suzuki@xxx.com | E-MAIL | 2008/03/25 22:04:23 |

140

DATA FIELD SET

SELECTION OF FIELD TO BE ENABLED IN TELEPHONE DIRECTORY

▲ ☑ NICKNAME

☐ ROMANIZATION

▼ ☐ TELEPHONE NUMBER

PLEASE CHECK FIELDS THAT YOU NEED.

FIG.9

CONFIRMATION THAT SETTING CANNOT BE MODIFIED

CURRENT NUMBER OF RECORDS : 80

RECORDABLE NUMBER OF RECORDS
BEFORE MODIFICATION : 92

RECORDABLE NUMBER OF RECORDS
AFTER MODIFICATION : 64

TELEPHONE DIRECTORY CANNNOT BE MODIFIED,
BECAUSE OF CAPACITY SHORTAGE.

FIG.10

CONFIRMATION OF MODIFYING TELEPHONE DIRECTORY

CURRENT NUMBER OF RECORDS : 48

RECORDABLE NUMBER OF RECORDS
BEFORE MODIFICATION : 92

RECORDABLE NUMBER OF RECORDS
AFTER MODIFICATION : 64

TELEPHONE DIRECTORY WILL BE MODIFIED. ARE YOU OK ?

16

CONFIRMATION OF MODIFYING TELEPHONE DIRECTORY

RESIDUAL DATA IS FOUND WITH RESPECT TO
THE SELECTED FIELD.
IF YOU CONTINUE, THE RESIDUAL DATA WILL BE LOST.

DO YOU PROCEED ?

FIG.16

```
NEW RECORDATION OF CONTACT

▲     NAME OF CONTACT  : _

NICKNAME         :

▼     FAX NUMBER       :

PLEASE INPUT NECESSARY DATA INTO FIELDS.
```

FIG.17

```
NEW RECORDATION OF CONTACT

▲     NAME OF CONTACT  : _

NICKNAME         :

▼     ROMANIZATION     : DISABLED

PLEASE INPUT NECESSARY DATA INTO FIELDS.
```

FIG.18

A NUMBER OF RECORDS THAT DATABASE
CAN RECORD BECOMES SMALL.

FOLLOWING FIELD HAS "0" RECORD. IF THIS FIELD IS DELETED, NUMBER OF RECRDS THAT DATABASE CAN RECORD WILL INCREASE.

FIELD : BIRTHDAY

DO YOU DELETE THIS FIELD?

FIG.19

A NUMBER OF RECORDS THAT DATABASE
CAN RECORD BECOMES SMALL.

FOLLOWING FIELD HAS NOT BEEN USED MORE THAN ONE YEAR. IF THIS FIELD IS DELETED, NUMBER OF RECRDS THAT DATABASE CAN RECORD WILL INCREASE.

FIELD : ADDRESS

DO YOU DELETE THIS FIELD?

FIG.20

A NUMBER OF RECORDS THAT DATABASE
CAN RECORD BECOMES SMALL.

FOLLOWING RECORD HAS NOT BEEN USED MORE THAN ONE YEAR. IF THIS RECORD IS DELETED, NUMBER OF RECRDS THAT DATABASE CAN RECORD WILL INCREASE.

RECORD : ICHIRO SATO

DO YOU DELETE THIS FIELD?

COMMUNICATION DEVICE AND METHOD FOR REJECTING TO STORE DATA IN A DISABLED DATABASE FIELD

CROSS REFERENCE TO RELATED APPLICATION

This application claims priority from Japanese Patent Application No. 2008-177463 filed Jul. 8, 2008. The entire content of the priority application is incorporated herein by reference.

TECHNICAL FIELD

The invention relates to a communication device having a communication function, such as a telephone set, a facsimile machine, a multifunction peripheral, and a cellular telephone. The invention particularly relates to a communication device provided with a database storing contact data, such as the names and telephone numbers of contacts.

BACKGROUND

Conventionally, communication devices provided with a telephone function, facsimile function, or other communication functions have also been provided with a database (also referred to as a "telephone directory" or "address directory"; hereinafter, this database will be referred to as a "telephone directory") for storing contact data, such as telephone numbers, fax numbers, and e-mail addresses. After recording data for a contact in the telephone directory, the user can initiate a call to a contact simply by selecting the contact from the telephone directory. In this way, the user can initiate calls to contacts without having to input the contact's telephone number or other contact data and without having to remember those numbers, while at the same time avoiding calls to wrong numbers caused by incorrectly entering the number. As a result, telephone directories are now in widespread use in all types of communication devices.

SUMMARY

In recent years, however, there has been a trend in conventional communication devices to provide the telephone directory with an extensive number of entry fields. For example, in addition to having entry fields for the contact's name and telephone numbers, the telephone directory allows the user to input an address, pronunciation (yomigana; Japanese phonetic characters indicating the pronunciation of kanji) of the contact's name, romanization (Japanese characters expressed in the Latin alphabet) of the contact's name, job title, group name, and the like and to input the user's birthday and blood type and set an image and ringtone for use when calls are received from the contact. However, since some users utilize only a small number of the data fields in the telephone directory, such as the contact's name and telephone number, the increasing number of entry fields has led to an increasing number of unused entry fields (hereinafter referred to as "unused fields"). Still, the telephone directory accepts input in these unused fields, leading to such problems as the user mistakenly inputting data into an inappropriate field.

In view of the foregoing, it is an object of the invention to provide a communication device capable of overcoming the problems associated with the conventional communication devices described above by simplifying operations while preventing the user from incorrectly inputting data into unused fields of the telephone directory.

BRIEF DESCRIPTION OF THE DRAWINGS

Embodiments in accordance with the invention will be described in detail with reference to the following figures wherein:

FIG. 3 shows recorded contents of a telephone directory as an example;

FIG. 9 is an example of a display window for confirming that a setting cannot be modified;

FIG. 10 is an example of the display window for confirming whether to restructure the telephone directory;

FIG. 12 is a flowchart illustrating steps in a fax transmission process;

FIG. 16 is an example of the display window for adding a new record without displaying disabled fields;

FIG. 17 is an example of the display window for adding a new record in which the disabled field is identified;

FIG. 18 is an example of the display displaying a message when a field in which the number of recorded data entries is "0" is identified.

FIG. 19 is an example of the display displaying a message when a field whose access date is more than one year ago is identified; and FIG. 20 is an example of the display displaying a message when a record whose access date is more than one year ago is identified.

DETAILED DESCRIPTION

Next, an embodiment of the invention will be described while referring to the accompanying drawings. In the embodiment, the invention is applied to a fax machine equipped with a telephone directory for storing names, fax numbers, e-mail addresses, and other information for contacts.

[Overall Structure of the Fax Machine]

Figure 1:
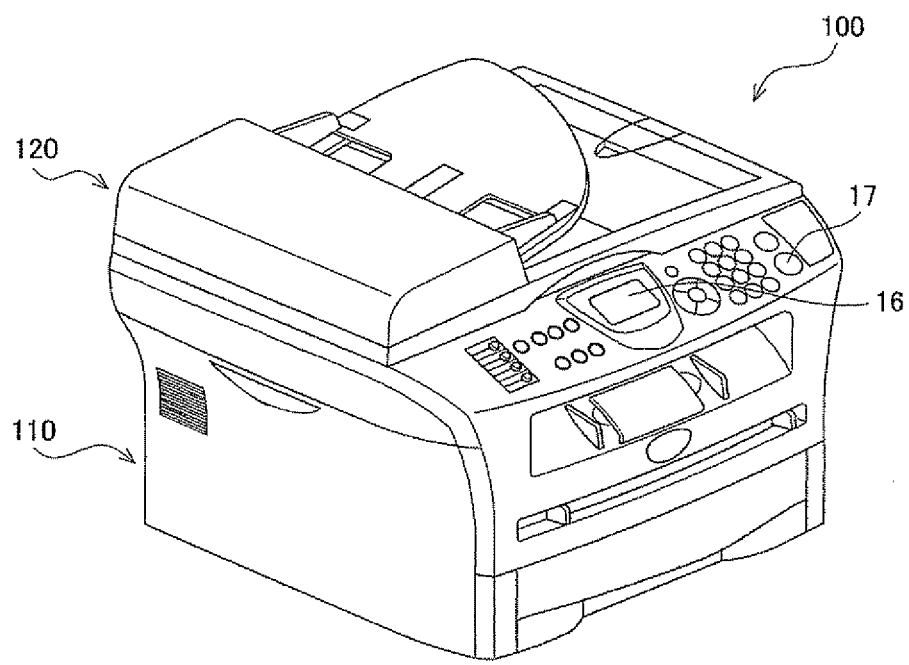
FIG. 1 is a perspective view showing an external structure of a fax machine according to an embodiment.

As shown in FIG. 1, a fax machine 100 according to the embodiment includes a main body provided with an image-forming unit 110 for printing images on paper, and a scanner unit 120 for scanning images on an original document. The fax machine 100 of the embodiment has a fax transmission function and fax reception function, as well as a scanner function, e-mail transmission function, and multilingual function for switching the language in which text is displayed.

The image-forming unit 110 is provided with a paper cassette for accommodating sheets of paper, and a discharge tray for receiving the sheets of paper after image formation. Image formation on the image-forming unit 110 may be performed with an electrophotographic system or an inkjet system and may produce either color images or monochromatic images only.

A control panel is provided on the scanner unit 120 and includes an operating section 17 configured of various buttons, including a Start button, a Stop button, and a numerical keypad, for example; and a display unit 16 configured of a liquid crystal display. The control panel displays the operating status of the fax machine 100 and enables the user to input instructions.

Figure 2:
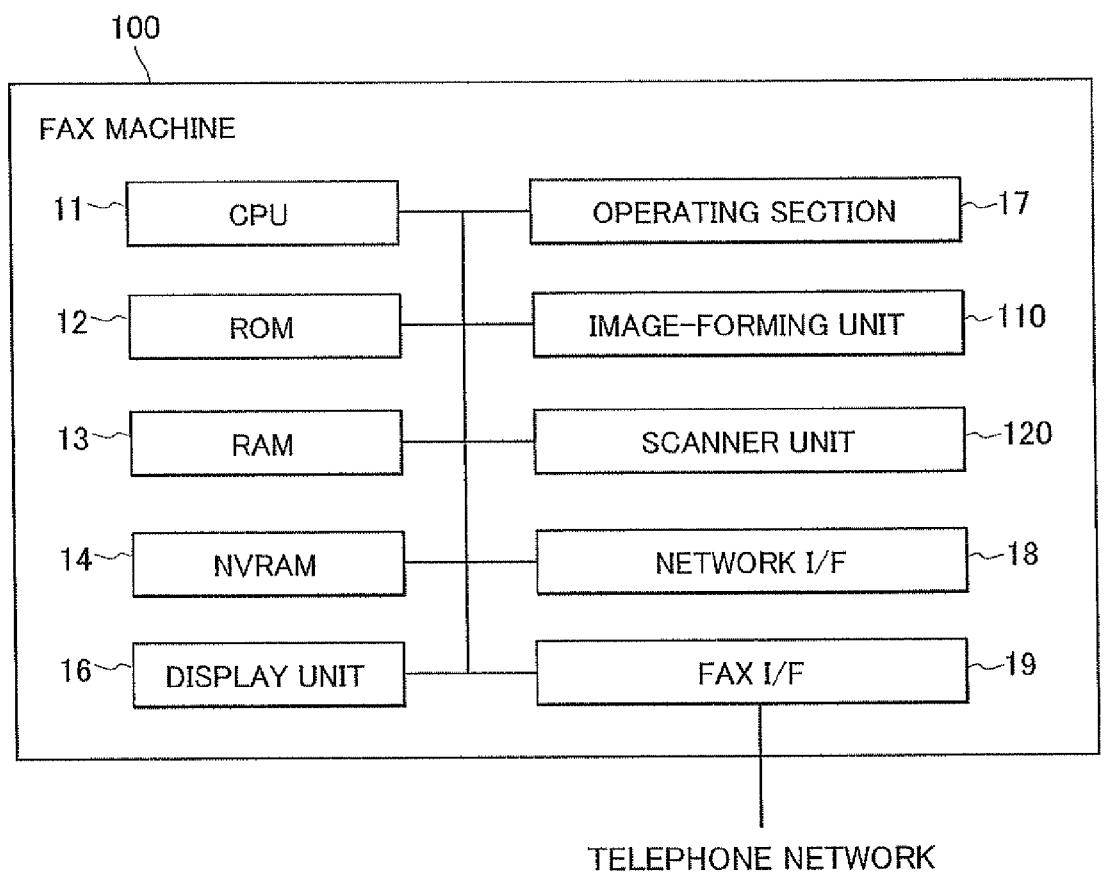
FIG. 2 is a block diagram showing an electrical structure of the fax machine.

FIG. 2 shows the electrical structure of the fax machine 100. In addition to the display unit 16, the operating section 17, the image-forming unit 110, and the scanner unit 120 described above, the fax machine 100 includes a CPU 11, a ROM 12, a RAM 13, a nonvolatile memory (hereinafter referred to as "NVRAM") 14, a network interface 18, and a fax interface 19.

The CPU 11 performs central control of the fax machine 100, executing operations to implement the various functions of the fax machine 100, including a scanner function, a printer function, and fax transmission and reception functions. The ROM 12 stores various control programs, settings, initial values, and the like for controlling the fax machine 100. The RAM 13 serves as a work area in which the CPU 11 loads the control programs, and a storage area for temporarily storing image data and the like. The NVRAM 14 is nonvolatile RAM that stores various settings, image data, and the like. The NVRAM 14 also stores a telephone directory 140, a field database 141, and a function database 142 described later (see FIGS. 3 through 5).

A data processor (not shown), such as a personal computer (PC), can be connected to the fax machine 100 via the network interface 18 and can perform bi-directional data communications with the fax machine 100 via the network interface 18. The fax interface 19 is connected to a telephone network and functions to implement facsimile communications. More specifically, the fax interface 19 is configured of a network configuration utility (NCU), modem, and the like.

When fax data is received via the fax interface 19, the fax machine 100 performs a process for controlling the image-forming unit 110 to form images on paper based on the fax data. The fax machine 100 also performs processes to generate fax data based on image data scanned by the scanner unit 120 or image data inputted via the network interface 18 and to transmit this fax data to a contact via the fax interface 19.

The telephone directory 140 provided in the NVRAM 14 of the fax machine 100 stores names, fax numbers, and other data for contacts. More specifically, the content of the telephone directory 140 is structured like the table shown in FIG. 3, with various columns, or fields, and a plurality of records storing a data entry for each field. The telephone directory 140 in the example shown in FIG. 3 has a record number column storing control numbers assigned to the records, a name column storing the names of contacts, a data field set configured of various data fields storing information related to each contact, and an access date column storing the date and time at which the contact data was last accessed (e.g., created, edited, or selected as a fax destination). That is, the access date is updated when a new record is added (created) and when a fax is transmitted to the contact. The access date is also updated when the contact data is edited. The data field set may be configured of fields for storing fax numbers, e-mail addresses, and communication modes, as well as incidental information, such as the contact's address, nickname of the contact, yomigana (indicating pronunciation of a Japanese name), romanization (Japanese name written in the Latin alphabet), job title, group name, birthday, blood type, image, and ringtone may be set as fields. The user may set fields to "enabled" or "disabled" as desired. The enabled or disabled status of each field is stored in the field database 141 described later. Consequently, the telephone directory 140 is configured of only fields set as enabled in the field database 141.

Figure 4:
FIG. 4 shows recorded contents of a field database.

The field database 141 stored in the NVRAM 14 stores field data for the data field set in the telephone directory 140. As shown in FIG. 4, the field database 141 is configured of a field number column, a field name column, a status column, and a field access time column. The field number column stores numbers assigned to the fields. The field name column stores names of fields. The status column stores the enabled/disabled status of the field. The field access time column stores the time and date that the field was last accessed. The field access date column is updated each time the user enters, deletes, or edits data for the field or uses data in the field.

Figure 5:
FIG. 5 shows recorded contents of a function database.

The function database 142 stored in the NVRAM 14 stores correlations between functions possessed by the fax machine 100 and fields that can be set in the telephone directory 140. As shown in FIG. 5, the function database 142 is configured of a function number column, a function name column, a field number column, and a status column. The function number column stores numbers assigned to the functions. The function name column stores names of functions. The field number column lists numbers of fields associated with the function. The status column stores the enabled/disabled status of the function. The numbers stored in the field number column are taken from the field number column in the field database 141 for fields associated with the functions. In other words, the numbers stored in the field number column correspond to numbers in the field number column of the field database 141.

The telephone directory 140, the field database 141, and the function database 142 shown in FIGS. 3 through 5 are merely examples, and the invention is not limited to these configurations.

[Operations of the Fax Machine]

Next, the operations of the fax machine 100 will be described. The fax machine 100 of the embodiment allows the user to set fields in the telephone directory 140 to "enabled" or "disabled" (hereinafter referred to as the "enabled/disabled setting") and has a function for restructuring the telephone directory 140 based on these settings. The following description on the operations of the fax machine 100 is centered on processes related to the telephone directory 140.

[Telephone Directory Modification Process]

Figures 6, 7:
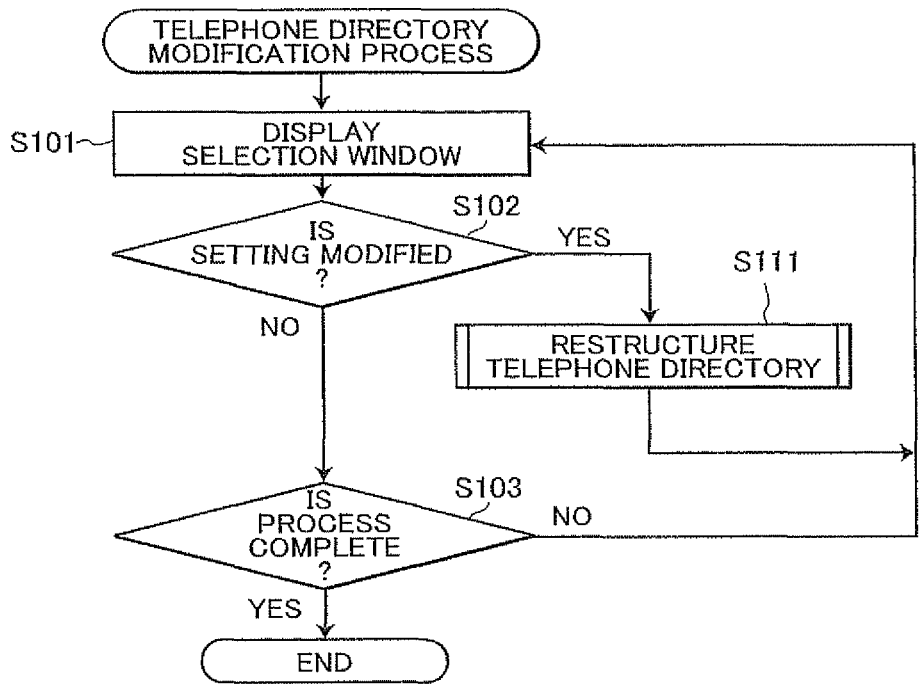
FIG. 6 is a flowchart illustrating steps in a telephone directory modification process.
FIG. 7 is an example of a selection window on which a user sets fields in the telephone directory to be enabled or disabled.

First, a telephone directory modification process for setting the configuration of the telephone directory 140 will be described with reference to the flowchart in FIG. 6.

In S101 at the beginning of the telephone directory modification process, the CPU 11 of the fax machine 100 displays a selection window on the display unit 16 for enabling or disabling fields in the telephone directory 140, and specifically fields constituting the data field set. As shown in the example of FIG. 7, the fax machine 100 displays a list of fields stored in the field database 141 next to checkboxes 161 for enabling or disabling the field. The user checks a checkbox 161 to enable the corresponding field, and unchecks the checkbox 161 to disable the field. In the initial display state, the CPU 11 checks the checkboxes 161 corresponding to fields whose status column in the field database 141 indicates "enabled" and does not check checkboxes 161 corresponding to fields whose status colt indicates "disabled." Accordingly, the user can immediately recognize which fields are currently being used.

In S102 the CPU 11 determines whether a setting in the display window has been modified. In other words, the CPU 11 determines whether the state of any checkbox 161 has been changed. If a setting has been modified (S102: YES), in S111 the CPU 11 restructures the telephone directory 140 based on the modified checkbox 161. The restructuring process for the field database 141 will be described later in greater detail.

However, if a selection has not been modified (S102: NO), in S103 the CPU 11 determines whether editing of the telephone directory 140 is complete. For example, if a Reset button on the operating section 17 has been pressed or a command has been issued to execute another function, the CPU 11 determines that the process to edit the telephone directory 140 has ended. If the process has not ended (S103: NO), the CPU 11 returns to S101 and repeats the process described above. However, if the process has ended (S103: YES), the telephone directory modification process ends.

[Telephone Directory Restructuring Process]

Figure 8:
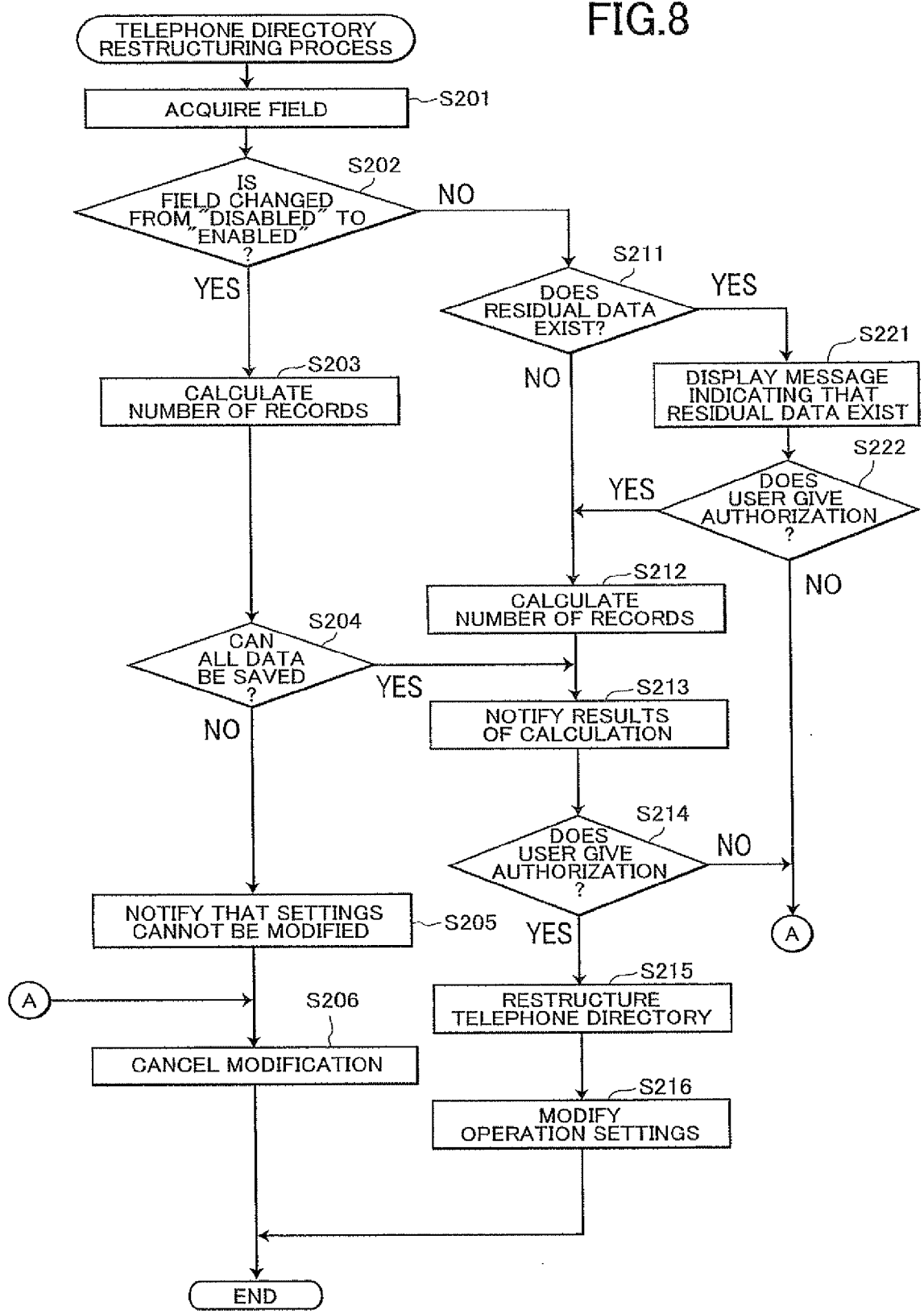
FIG. 8 is a flowchart illustrating steps in a telephone directory restructuring process.

Next, the process of S111 for restructuring the telephone directory 140 will be described with reference to the flowchart in FIG. 8. As described above, the CPU 11 executes this process each time the checked state of any checkbox 161 changes.

In S201 at the beginning of the telephone directory restructuring process, the CPU 11 acquires the field whose setting has been modified. That is, the CPU 11 acquires the field corresponding to the checkbox 161 whose status has been changed. In S202 the CPU 11 determines whether the modified field has been changed from "disabled" to "enabled."

If the setting has been changed from "disabled" to "enabled" (S202: YES), indicating that the number of fields constituting the telephone directory 140 will increase, in S203 the CPU 11 calculates the number of records that can be recorded in the telephone directory 140 after modification. The recordable number of records is calculated based on the current amount of available memory, the amount of increased memory usage per record resulting from adding the new field, the current total number of records, the amount of required memory per record after modification, and the like.

In S204 the CPU 11 determines whether all data recorded in the telephone directory 140 can be saved when restructuring the telephone directory 140. In other words, the CPU 11 determines whether the current number of records is smaller than the calculated number of records that can be recorded in the telephone directory 140.

If the CPU 11 determines that all data for the restructured telephone directory 140 cannot be saved (S204: NO), in S205 the CPU 11 issues a notification indicating that the setting cannot be modified, together with the results of the calculation in S203. In the notification of S205, the CPU may specify the number of records that can be recorded in the telephone directory 140 after modification and display information with respect to the difference between the number of records that are recorded in the telephone directory 140 after modification and the number of records that are recorded in the telephone directory 140 before modification. Further, the CPU 11 may displays other information that is used in the calculation step S203, such as, the amount of required memory per record after modification. For example, the CPU 11 displays a message, such as that shown in FIG. 9, on the display unit 16. In S206 the CPU 11 cancels the modified setting by returning the modified checkbox 161 to an unchecked state, for example, and subsequently ends the telephone directory restructuring process.

However, if the CPU 11 determines that all data in the telephone directory 140 can be saved (S204: YES), in S213 the CPU 11 displays the results of the calculation in S203 and prompts the user to indicate whether to restructure the telephone directory 140. Specifically, the CPU 11 displays the number of records that can be recorded in the telephone directory 140 prior to modification and after modification and displays a message prompting the user to indicate whether to restructure the telephone directory 140, as shown in FIG. 10. The user can indicate a desire to restructure the telephone directory 140 by pressing the Start button in the operating section 17, for example, or can cancel restructuring by pressing the Stop button in the operating section 17. In S214 the CPU 11 determines whether the user has authorized restructuring of the telephone directory 140.

If the user does not authorize restructuring of the telephone directory 140 (S214: NO), then the CPU 11 jumps to S206, cancels the setting modification, and ends the telephone directory restructuring process. However, if the user authorizes restructuring (S214: YES), in S215 the CPU 11 restructures the telephone directory 140 by creating a new telephone directory 140 with the additional field enabled. At this time, the CPU 11 updates the status and field access date in the field database 141 for the newly enabled field.

In S216 the CPU 11 modifies operation settings for functions related to the modified field. In other words, the CPU 11 enables the execution of functions related to the newly enabled field. For example, if the field "E-mail" has been enabled, the CPU 11 enables a function for transmitting e-mail. If the field "Fax number" has been enabled, the CPU 11 enables a function for transmitting facsimiles. Here, the CPU 11 can access the function database 142 to acquire the type of function related to the field. After completing the process in S216, the CPU 11 ends the telephone directory restructuring process.

Figure 11:
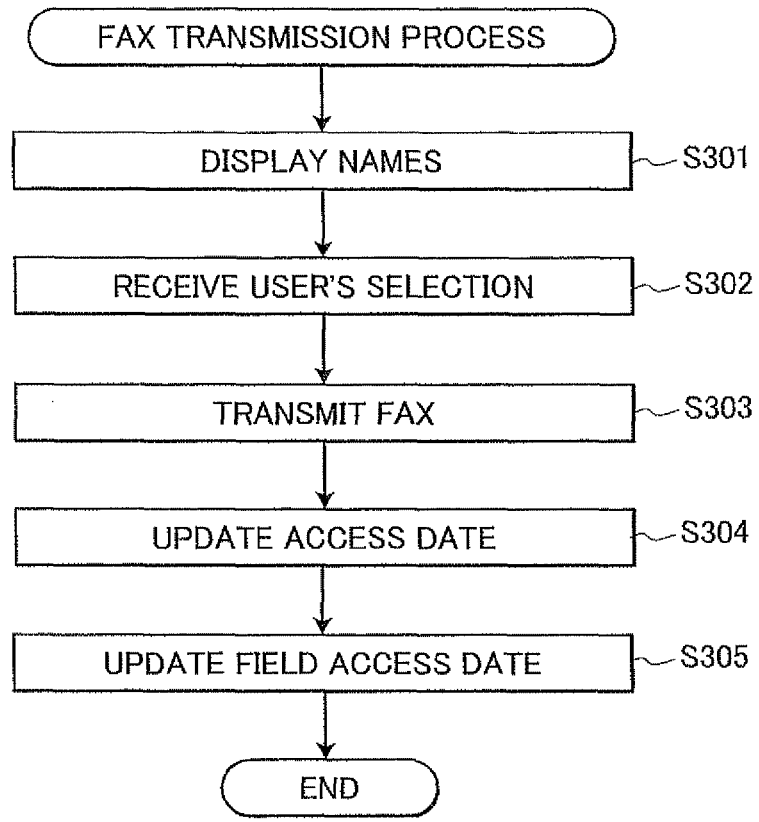
FIG. 11 is an example of the display window for coding whether to deletes data.

Returning to the determination in S202, if the CPU 11 determines that a field has been modified from "enabled" to "disabled" (S202: NO), indicating that the number of fields constituting the telephone directory 140 will decrease, in S211 the CPU 11 determines whether data is currently recorded in the field being deleted (hereinafter, data recorded in a field that has been disabled will be referred to as "residual data"). If any residual data exists (S211: YES), in 8221 the CPU 11 displays a message on the display unit 16 indicating that residual data exists and that this residual data will be lost if the user continues, and prompting the user to confirm whether to continue, as shown in FIG. 11. The user, for example, pushes the button in the operating section 17 for permitting to continue or not to continue.

In S222 the CPU 11 determines whether the user has given authorization to delete the data. If the user did not give authorization (S222: NO), then the CPU 11 jumps to S206, cancels the setting modification, and ends the telephone directory restructuring process.

However, if the user has given authorization to delete the data (S222: YES) or if the CPU 11 determined in S211 that no residual data exists (S211: NO), in S212 the CPU 11 calculates the number of records that can be recorded in the telephone directory 140 after disabling the field. As described above, the number of records that can be recorded in the telephone directory 140 is calculated based on the current amount of available memory, the amount of decreased memory usage per record caused by deleting the field, the current total number of records, the amount of required memory per record after modification, and the like.

In S213 the CPU 11 displays the results of the calculation in S212 and prompts the user to indicate whether to restructure the telephone directory 140. In S213 the CPU may display the number of records that can be recorded in the telephone directory 140 after disabling the field and also display information with respect to the difference between the number of records that are recorded in the telephone directory 140 after disabling the field and the number of records that are recorded in the telephone directory 140 before disabling the field. Further, the CPU 11 may displays other information that is used in the calculation step S212, such as, the amount of required memory per record after modification. In S214 the CPU 11 determines whether the user has authorized restructuring of the telephone directory 140. If the user does not authorize restructuring (S214: NO), the CPU 11 jumps to S206, cancels the setting modification, and ends the telephone directory restructuring process.

However, if the user authorizes restructuring (S214: YES), in S215 the CPU 11 restructures the telephone directory 140 by creating a new telephone directory 140 after deleting the newly disabled field. At this time, the CPU 11 updates the status and field access date in the field database 141 corresponding to the deleted field.

In S216 the CPU 11 modifies an operation setting for the functions related to the modified field. That is, the CPU 11 disables the function related to the newly disabled field. For example, if the field "E-mail" has been disabled, the CPU 11 disables the functions related to e-mail transmissions, where "disabling the functions" involves disabling all or some of the fractions related to e-mail transmission. For example, the CPU 11 may disable the automatic transmission function for automatically acquiring an e-mail address from the telephone directory 140 and transmitting e-mail when a prescribed condition is met, while not disabling manual transmission in which the user sends e-mail by directly inputting an e-mail address. Further, the CPU 11 may identify the functions that have been disabled by graying out input buttons associated with e-mail transmission in the display on the display unit 16 or modifying the font in the displayed content. Further, if lamps are used in the operating section 17 to illuminate operating buttons, for example, the CPU 11 may turn off or flash the lamps corresponding to the relevant buttons to identify which functions have been disabled. The CPU 11 can access the function database 142 to acquire the type of functions related to the disabled field. After completing the process in S216, the CPU 11 ends the telephone directory restructuring process.

In this way, the fax machine 100 of the embodiment modifies the size per record in the telephone directory 140 according to the enabled/disabled setting for each field in the data field set. That is, the fax machine 100 deletes fields from the telephone directory 140 that the user has selected to be left unused and restructures the telephone directory 140 of the fields selected for use, thereby effectively utilizing storage space for the telephone directory 140. The fax machine 100 also modifies the operation setting for functions related to fields based on the enabled/disabled setting of each field, thereby avoiding an increased complexity in operation settings and reducing the chance of the user inputting data into the wrong field.

While the fax machine 100 modifies operation settings for related functions according to changes in the status of fields in the telephone directory modification process (S216), these processes may be performed in reverse, i.e., by modifying the status of the fields based on changes in the operation settings for functions. For example, if the e-mail transmission function has been disabled, the fax machine 100 may restructure the telephone directory 140 by deleting the "E-mail" field automatically. Alternatively, if the e-mail transmission function has been disabled, the fax machine 100 may restructure the telephone directory 140 by deleting the "E-mail" field after receiving user confirmation.

Additionally, if the fax machine 100 has a function for switching between a Japanese display language and an English display language, the field "yomigana" pronunciation) becomes unnecessary after switching from Japanese to English. Therefore, after the display language is switched from Japanese to English, the fax machine 100 may delete the "yomigana" field automatically or after receiving user confirmation and restructure the telephone directory 140. Conversely, if the display language has been changed from English to Japanese, the fax machine 100 may restructure the telephone directory 140 by adding the "yomigana" field automatically. Alternatively, if the display language has been changed from English to Japanese, the fax machine 100 may restructure the telephone directory 140 by adding the "yomigana" field after receiving user confirmation.

[Fax Transmission Process]

Next, an example of using the telephone directory 140 in the fax transmission process will be described with reference to the flowchart in FIG. 12. While the user may also directly input the fax number when transmitting a fax, in the following description the user selects a fax number from the telephone directory 140.

In S301 at the beginning of the fax transmission process, the CPU 11 displays names recorded in the name column of the telephone directory 140 on the display unit 16. The user browses the contacts and selects a desired record, and in S302 the CPU 11 receives the user's selection. In S303 the CPU 11 transmits the fax to the contact in the selected record.

In S304 the CPU 11 updates the access date for the selected record in the telephone directory 140. In S305 the CPU 11 updates the field access date corresponding to the field "Fax number" in the field database 141 because a fax has been transmitted using data recorded in the fax number column of the telephone directory 140. If there are other fields related to fax transmissions, the CPU 11 also updates the field access date for these fields at this time.

The fax transmission process ends after the CPU 11 updates the field database 141. In this way, the fax machine 100 updates the telephone directory 140 and the field database 141 each time the telephone directory 140 is used to transmit a fax or e-mail.

[Record Recording Process]

Figure 14:
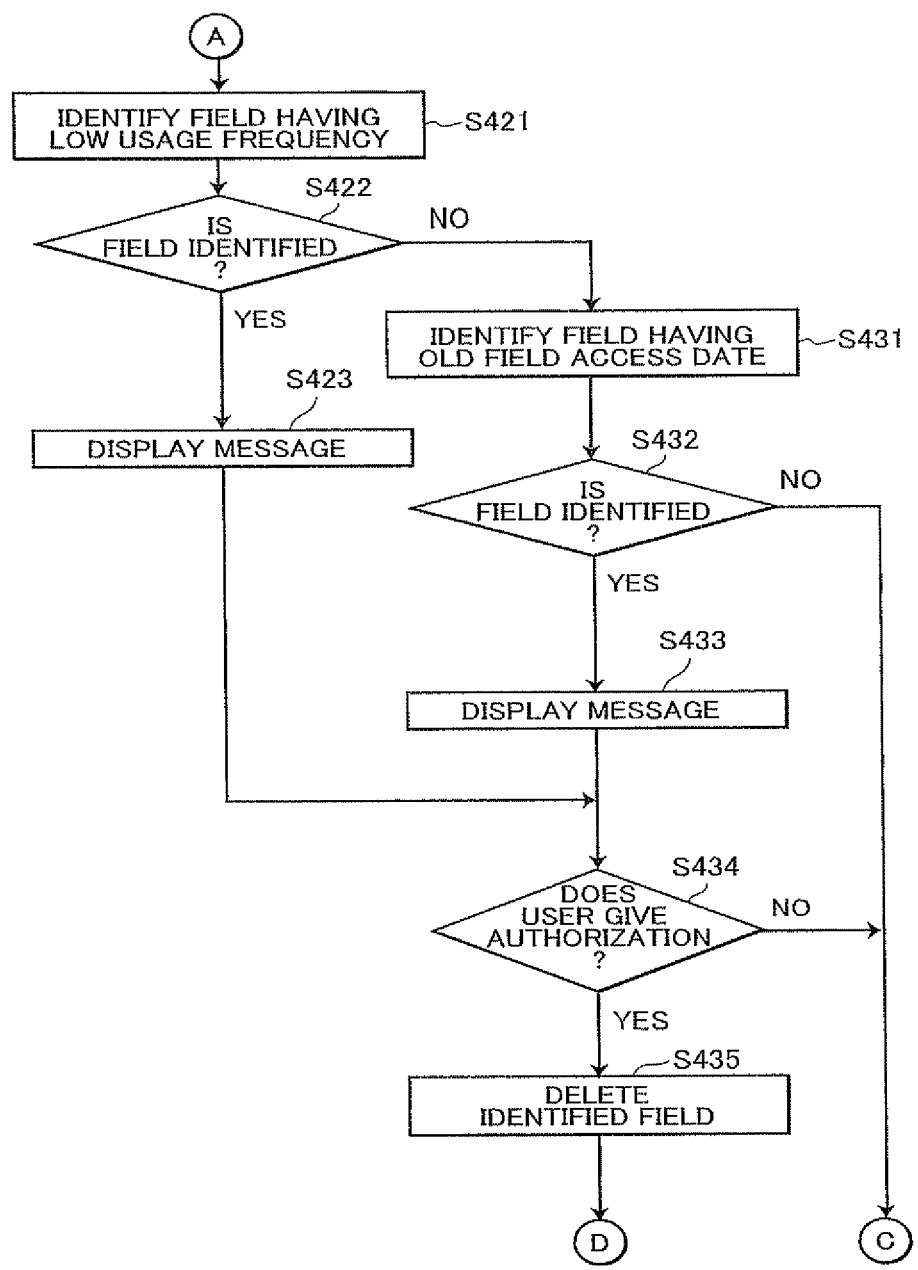
FIG. 14 is a flowchart illustrating a second part of steps in the record recording process.
Figure 15:
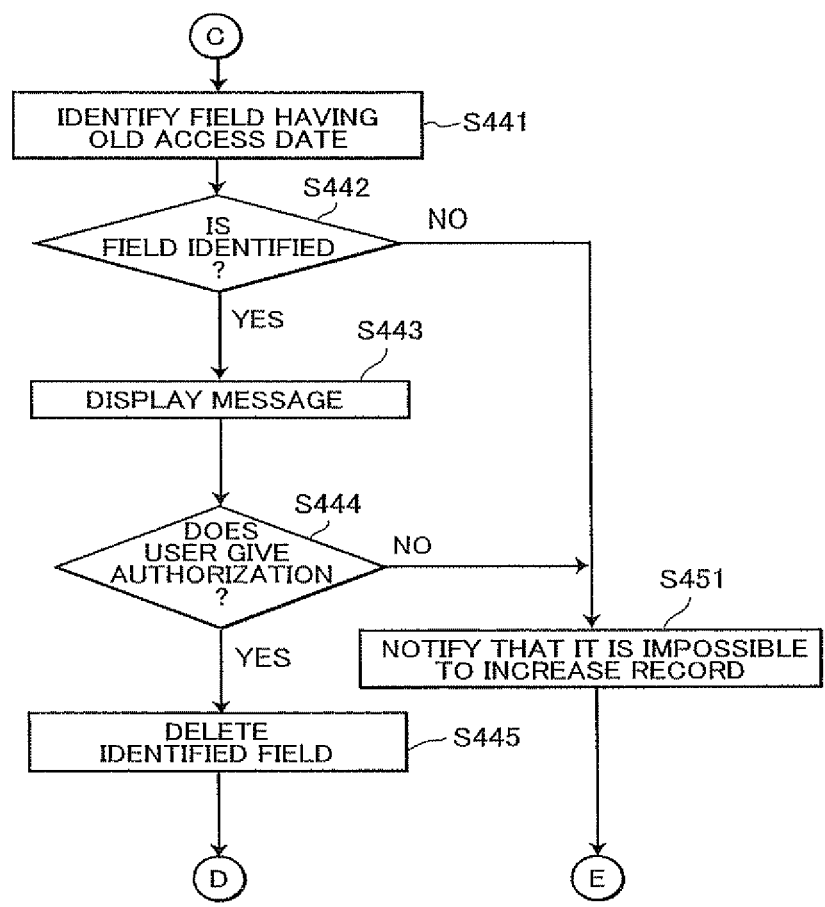
FIG. 15 is a flowchart illustrating a third part of steps in the record recording process.

Next, a record recording process for adding a new record to the telephone directory 140 will be described with reference to the flowcharts in FIGS. 13, 14, and 15.

Figure 13:
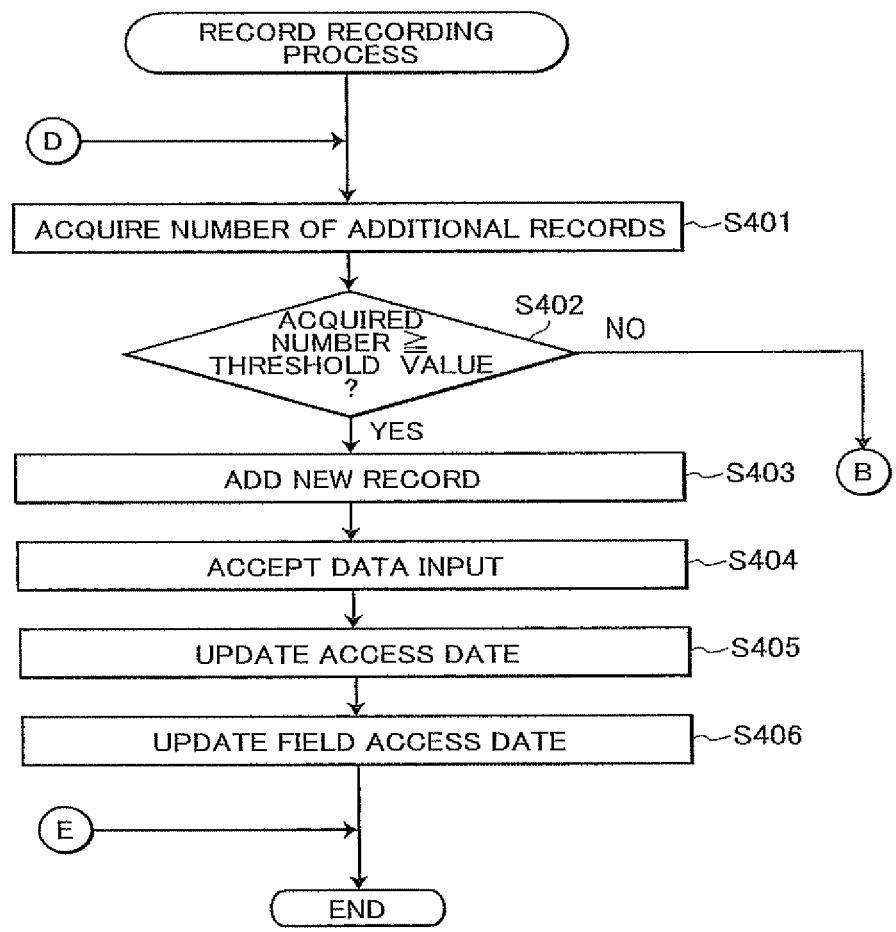
FIG. 13 is a flowchart illustrating a first part of steps in a record recording process.

As shown in FIG. 13, in S401 at the beginning of the record recording process, the CPU 11 acquires the number of additional records that can be recorded in the telephone directory 140. In S402 the CPU 11 determines whether the number acquired in S401 is greater than or equal to a threshold value. If the number of records that can be added is greater than or equal to the threshold value (S402: YES), in S403 the CPU 11 adds a new record to the telephone directory 140 and in S404 accepts data input from the user. At this time, the data field set of the telephone directory 140 is configured of fields set to "enabled" in the field database 141, and the CPU 11 does not display fields set to "disabled" in the field database 141. For example, if the content of the field database 141 is that shown in FIG. 4, then fields such as "Romanization" and "Telephone number" are not displayed, as shown in FIG. 16. By configuring the telephone directory 140 of only fields that will be used, the fax machine 100 can simplify the input window.

Here, it is not absolutely necessary to remove disabled fields from the display. If disabled fields are not displayed, the user will be unable to discern that a field has been disabled from the input window. Hence, the fax machine 100 may display disabled fields in the input window, but in a way that the user can identify which fields have been disabled. Using the example of content for the field database 141 shown in FIG. 4, the field "Romanization" is displayed, but is followed by the qualifier "disabled," as shown in FIG. 17, letting the user know that this disabled field exists. Other methods for identifying fields as being disabled besides displaying the word "disabled," as in the example of FIG. 17, are graying out the name of the fields or displaying the disabled field names in a modified font (at a reduced size, in italics, or with a strike-through line), for example.

In S405 the CPU 11 updates the access date in the newly added record. In S406 the CPU 11 updates the field access date in the field database 141 corresponding to the fields into which data has been entered. The record recording process ends after the field database 141 is updated.

However, if the number of additional records that can be added to the telephone directory 140 is less than the threshold value (S402: NO), in S421 of FIG. 14 the CPU 11 identifies fields in the data field set of the telephone directory 140 in which the number of recorded data entries is less than or equal to another threshold value. In other words, the CPU 11 identifies fields having the lowest usage frequency. For example, if the threshold value is set to "0", the CPU 11 identifies fields having no recorded data entries.

In S422 the CPU 11 determines whether a field whose number of recorded data entries is less than or equal to another threshold value has been found in S421. If the CPU 11 identifies a field or fields having a number of data entries less than or equal to the threshold value (8422: YES), in S423 the CPU 11 displays a message on the display unit 16, such as that shown in FIG. 18, notifying the user that a new record can be added by deleting the identified field(s) and asks the user for permission to delete the field and restructure the telephone directory 140. In other words, in S423 the CPU 11 displays the identified field in a manner specifying the number of recorded data entries in the identified field is less than or equal to another threshold value. The user, for example, pushes the buttons in the operating section 17 for permitting to delete or not to delete the field(s).

On the other hand, if the CPU 11 does not identify a field having a number of data entries less than or equal to the threshold value (S422: NO), in S431 the CPU 11 identifies fields within the data field set in the telephone directory 140 having a field access date older than a prescribed time value. That is, the CPU 11 identifies fields having the least usage frequency according to a different criterion than that in S422. For example, if the prescribed value is one year in the embodiment, the CPU 11 identifies fields whose field access date is at least one year or older.

In S432 the CPU 11 determines whether the field whose field access date is older than the prescribed value is identified. When the CPU 11 identifies a field or fields whose field access date is older than the prescribed value (S432: YES), in S433 the CPU 11 displays a message on the display unit 16, such as that shown in FIG. 19, notifying the user that a new record can be added by deleting the identified field(s) and restructuring the telephone directory 140 and prompts the user to indicate whether to delete this field(s) and restructure the telephone directory 140. In other words, in S433 the CPU 11 displays the identified field in a manner specifying the access date of the identified field is older than a prescribed time value. The user, for example, pushes the buttons in the operating section 17 for permitting to delete or not to delete the field(s).

After completing the process in S423 or S433, in S434 the CPU 11 determines whether the user has given permission to restructure the telephone directory 140. If the user has authorized restructuring of the telephone directory 140 (S434: YES), in S435 the CPU 11 deletes the identified field(s) and restructures the telephone directory 140. At this time, the CPU 11 updates the status and field access date in the field database 141 for the identified field(s). Subsequently, the CPU 11 returns to S401 in FIG. 13 and again determines whether another record can be added.

However, if the user does not authorize restructuring in S434 (S434: NO) or if the CPU 11 does not identify any fields having an older field access date than the prescribed value (S432: NO), then the CPU 11 advances to S441 in FIG. 15 to identify any records recorded in the telephone directory 140 having an access date older than a prescribed value. In other words, the CPU 11 identifies records that have the lowest usage frequency. For example, if the prescribed value is one year in the embodiment, the CPU 11 extracts records whose last access date is at least one year earlier.

If the CPU 11 identified a record or records having an older access date than the prescribed value (S442: YES), in S443 the CPU 11 displays a message on the display unit 16, such as that shown in FIG. 20, notifying the user that a new record can be added by deleting the identified record(s). In S444 the CPU 11 asks the user whether to delete the identified record(s). The user, for example, pushes the button in the operating section 17 for permitting the CPU 11 to delete or not to delete the record(s).

If the user authorizes deletion of the record(s) (S444: YES), in S445 the CPU 11 deletes the identified record(s) and subsequently returns to S401 of FIG. 13 to determine again whether another record can be added. However, if the user does not authorize deletion of the record(s) (S444: NO) or if the CPU 11 does not identity a record having an older access date than the prescribed value (S442: NO), then in S451 the CPU 11 notifies the user that the telephone directory 140 is full, i.e., that there is insufficient storage capacity for adding another record, and subsequently ends the record recording process.

Hence, in the above process, according to the telephone directory 140 of the embodiment, the CPU 11 determines whether a record can be added to the telephone directory 140 when the user wishes to add a new record, and either restructures the telephone directory 140 or deletes the new record if the record cannot be added. That is, when the number of records has neared the limit, the fax machine 100 can extend the limit on the number of recordable records in order to store more data by deleting a field in the telephone directory 140 that is used least frequently, or can reliably add new records by deleting records used with the least frequency.

With the fax machine 100 according to the embodiment described above, the user can select which fields in the data field set of the telephone directory 140 are to be used. When the user specifies a field that is not to be used, the fax machine 100 restructures the telephone directory 140 by deleting this field, preventing the user from inputting data into the field. Therefore, the fax machine 100 can prevent the user from incorrectly inputting data into an unused field by prohibiting input in unused fields. By so doing, the fax machine 100 can also more clearly indicate the fields in which data can be inputted, reducing any potential confusion to the user.

While the invention has been described in detail with reference to the above embodiment thereof, it would be apparent to those skilled in the art that various changes and modifications may be made therein without departing from the spirit of the invention. While the invention is applied to a fax machine in the embodiment described above, the invention may be applied to any device having a communication function and a telephone directory. For example, the invention may be applied to a multifunction peripheral provided with a telephone function and a PC-FAX function, a personal computer having a telephone function or a fax function, and a mobile communication device, such as a cell phone.

In the telephone directory modification process described in the embodiment, the fax machine 100 executes a restructuring process each time the status of a checkbox is modified, but the invention is not limited to this method. For example, the display window may also be provided with a Confirmation button or the like for triggering execution of the restructuring process. When the user presses the confirmation button, the fax machine 100 identifies the fields associated with checkboxes whose status has been modified and restructures the telephone directory 140 to reflect all changes in status at one time.

In the record recording process according to the embodiment described above, the fax machine 100 uses the access dates for fields or the access dates for records to determine the usage frequency of the fields or records, but a different criterion for usage frequency may be used, such as the number of times each field or record has been referenced or the ratio of input in each field or record.

What is claimed is:

1. A communication device comprising:
   a storing unit that stores a database structured to have collection of records, each record being configured from a plurality of fields including a contact name field for entry of a name of a contact and a data field set including a plurality of fields for entry of data in association with the name of a contact;
   a first determining unit that is configured to determine whether a field included in the data field set is enabled or disabled;
   a rejection unit that is configured to reject to store data in a field of the database that is determined to be disabled by the first determining unit;
   a restructuring unit configured to restructure the database by deleting a field and residual data in the collection of records associated with the field that is determined to be disabled by the first determining unit;
   a communication unit that is communicable with the contact based on data in the database;
   a first calculating unit that is configured to calculate a first number of records making up a pre-restructure database and a second number of records making up a post-restructure database; and
   a first notifying unit that is configured to notify the second number together with information about a difference between the first number and the second number.

2. The communication device according to claim 1, further comprising:
   a first identifying unit that identifies a field in which the number of recorded entries is less than or equal to a reference value; and
   a first display unit that displays the field identified by the first identifying unit.

3. The communication device according to claim 2, further comprising a second calculating unit that is configured to calculate a third number of records that is capable of recording in database,
   wherein the first identifying unit and the display unit are activated when the first number becomes lower than a prescribed value.

4. The communication device according to claim 1, further comprising:
   a second identifying with that identifies a field having a field access time indicating a latest time when the field is accessed older than a prescribed time value; and
   a second display unit that displays the field identified by the second identifying unit.

5. The communication device according to claim 4, further comprising a third calculating unit that is configured to calculate a third number of records that is capable of recording in the database,
   wherein the second identifying unit and the second display unit are activated when the first number becomes lower than a prescribed value.

6. A communication device comprising:
   a storing unit that stores a database structured to have collection of records, each record being configured from a plurality of fields including a contact name field for entry of a name of a contact and a data field set including a plurality of fields for entry of data in association with the name of a contact;
   a first determining unit that is configured to determine whether a field included in the data field set is enabled or disabled;
   a rejection unit that is configured to reject to store data in a field of the database that is determined to be disabled by the first determining unit;
   a restructuring unit configured to restructure the database by deleting a field and residual data in the collection of records associated with the field that is determined to be disabled by the first determining unit;
   a communication unit that is communicable with the contact based on data in the database;
   a calculating unit that is configured to calculate a first number of records making up a pre-restructure database;
   a second determining unit that is configured to determine whether the storing unit has a storage area to store a post-restructure database when a post-restructure database is made up of a first number of records; and
   a notifying unit that is configured to notify that a determination by the second determining unit is negative.

7. A communication device comprising:
   a storing unit that stores a database structured to have collection of records, each record being configured from a plurality of fields including a contact name field for entry of a name of a contact and a data field set including a plurality of fields for entry of data in association with the name of a contact;
   a first determining unit that is configured to determine whether a field included in the data field set is enabled or disabled;
   a rejection unit that is configured to reject to store data in a field of the database that is determined to be disabled by the first determining unit;
   a restructuring unit configured to restructure the database by deleting a field and residual data in the collection of records associated with the field that is determined to be disabled by the first determining unit;
   a communication unit that is communicable with the contact based on data in the database;

a plurality of functional portions, each portion being operable to achieve a function;

a relation storing unit that stores a relation between the plurality of functional portions and fields; and a setting unit that is configured to set each of the plurality of functional portions to be enabled or disabled, wherein the first determining unit determines whether a field included in the data field set is enabled or disabled based on the setting of the plurality of functional portions by referring to the relation.

8. A method for controlling a communication device having a storing unit that stores a database structured to have collection of records, each record being configured from a plurality of fields including a contact name field for entry of a name of a contact and a data field set including a plurality of fields for entry of data in association with the name of a contact, the method comprising:

(a) determining whether a field included in the data field set is enabled or disabled;

(b) rejecting to store data in a field when the determining step (a) determines that the field is disabled;

(c) calculating a number of records that is capable of recording in the database;

(d) identifying a field in which the number of recorded entries is less than or equal to a reference value;

(e) displaying the field identified by the identifying step (d); and (f) communicating with the contact based on data in the database, wherein the identifying step (d) and the displaying step (e) are executed when the number is lower than a prescribed value.

9. The method according to claim 8, further comprising (g) identifying a field having a field access time indicating a latest time when the field is accessed older than a prescribed time value; and (h) displaying the field identified by the identifying step (g) wherein the identifying step (g) and the displaying step (b) are executed when the number calculated in step (c) is lower than a prescribed value.

10. The method according to claim 8, further comprising (g) restructuring the database by deleting a field and residual data in the collection of records associated with the field when the determining step (a) determines that the field is disabled.

11. A method for controlling a communication device having a storing unit that stores a database structured to have collection of records, each record being configured from a plurality of fields including a contact name field for entry of a name of a contact and a data field set including a plurality of fields for entry of data in association with the name of a contact, the method comprising:

(a) determining whether a field included in the data field set is enabled or disabled;

(b) rejecting to store data in a field when the determining step (a) determines that the field is disabled;

(c) calculating a number of records that is capable of recording in the database;

(d) identifying a field having a field access time indicating a latest time when the field is accessed older than a prescribed time value; and (e) displaying the field identified by the identifying step (d), wherein the identifying step (d) and the displaying step (e) are executed when the number calculated in step (c) is lower than a prescribed value.

* * * * *